Nov. 5, 1968 C. V. EICHOLTZ ET AL 3,409,208

DISPOSABLE CUPS AND HANDLES

Filed May 2, 1967 2 Sheets-Sheet 1

INVENTORS.
Clara Virginia Eicholtz
Edgar F. Trombly
Bertrand N. Trombley
BY
ATTORNEY Nov. 5, 1968  C. V. EICHOLTZ ET AL  3,409,208
DISPOSABLE CUPS AND HANDLES
Filed May 2, 1967  2 Sheets-Sheet 2

INVENTORS.
Clara Virginia Eicholtz
Edgar F. Trombly
Bertrand N. Trombley
BY
ATTORNEY

United States Patent Office 3,409,208
Patented Nov. 5, 1968

3,409,208
DISPOSABLE CUPS AND HANDLES
Clara Virginia Eicholtz, Midland, Edgar F. Trombly, Grosse Pointe Farms, and Bertrand N. Trombley, Bloomfield Hills, Mich., assignors to The Dow Chemical Company, Midland, Mich., a corporation of Delaware
Filed May 2, 1967, Ser. No. 635,450
2 Claims. (Cl. 229—52)

ABSTRACT OF THE DISCLOSURE

This invention concerns a plastic throw-away cup and handle wherein the handle is attached over the rim of the cup by the ultimate user. The handle is preferably of wire or plastic and includes a hook portion overriding the rim and a downwardly extending outwardly biasing leg which securely mates with an inverted channel along the side wall of the cup. Preferably a stack shoulder is included on the base of the cup for nesting of a plurality of the cups together.

---

Prior to the present invention disposable cups usually made of plastic were designed only to be gripped about their body portion. This often presented problems of heat transfer and made them generally inconvenient to handle unless they were placed in a handled holder of a permanent non-throw away type such as shown in U.S. Patent 2,070,414, or U.S. Design Patent 204,474, for example. Paper containers have had pull-out paper handles but, as is well known, this only gives a flimsy support for the cups. Other disposable handles, such as shown in U.S. Patent 2,070,367, have not been adequately mated with the cup nor of a cooperative design wherein a secure engagement between the two components can be achieved.

Accordingly, it is an object of the present invention to provide a container and handle therefor, both of which are designed to be disposed of after a single use, and which are mated together and adapted to be assembled by the ultimate user, and together provide an especially secure relationship heretofore unknown in disposable handled containers.

A more specific object of the present invention is to provide a throw-away handled container wherein the handle has a portion to hook over the rim of the container and a lower outwardly biased leg which securely mates with an inverted channel in the side wall of the container.

Yet additional objects and advantages of the present invention are even more apparent when taken in conjunction with the accompanying drawing in which like characters of reference designate corresponding material and parts throughout the several views thereof, in which.

Figure 2:
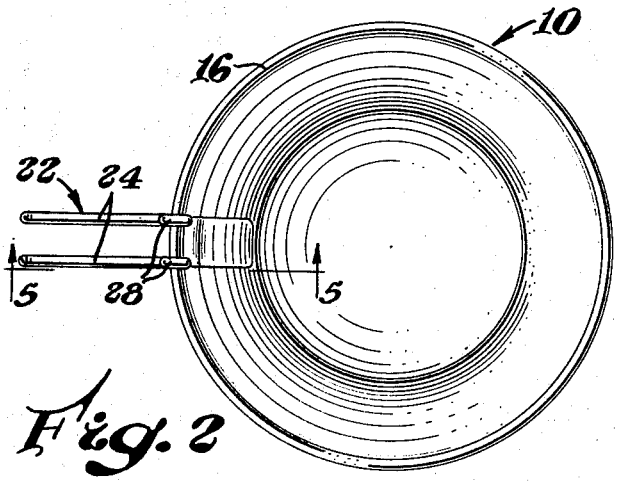
FIGURE 2 is a top plan view thereof.

The cups of the present invention are preferably formed of thermoplastic materials such as polystyrene, polypropylene, polystyrene foam, polyethylene foam, laminates of plastic films and foams, etc., and can be fabricated by such typical methods as injection molding, vacuum or plug assist pressure forming, or by the usual foam sheet forming techniques. The handles for these cups can be formed of substantially resilient wire material such as steel or certain metal alloys or from thermoplastic material such as polystyrene or the like which have sufficient strength and rigidity necessary to support the cup when filled with a liquid. The gauge or size of the handle is necessarily dependent on the size and weight of the container.

Referring now more particularly to the embodiment of FIGURES 1–5, there is shown a plastic container or cup 10 having a bottom wall 12, an upwardly and outwardly veering side wall 14 extending upwardly therefrom and ending in a peripheral rolled or beaded rim 16. A reverse tapered stack shoulder 18 is included at the bottom stacking ring 19 of the cup between the base 12 and the side wall 14 so that containers may be stacked together in a usual fashion. In such stacking, the bottom edge 20 of an upper cup rests upon the internal shoulder 18 of the next lower cup; this stacking relationship not being shown. The height of the stacking ring 19 can be just somewhat greater than the vertical distance between the bottom of horizontal extension 30, to be later described, and the top of rim 16, in the event it may be desired to stack cups 10 with their handles attached.

The bent wire handle 22 is shown as having a horizontal portion 24, a downwardly and then upwardly curved U-shaped portion 26 which is the main finger gripping portion of the handle 22. Bending upwardly and curving downwardly from horizontal portion 24 is an inverted U-shaped rim engaging hook 28 which is of a size adapted to engage over the rim 16 and extend at generally the same angle as the inside of the wall 14 a short distance into the interior of the cup. Connected to the other end of U-shaped portion 26 is a generally horizontal extension 30 which has a downwardly and outwardly veering leg 32 extending therefrom and engaged along its outside surface 34 with a channel 36 in the side wall 14 of cup 10.

Figure 3:
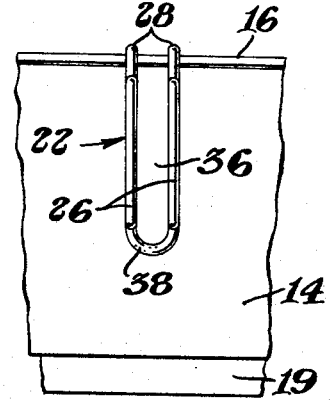
FIGURE 3 is a fragmentary rear elevational view thereof looking at the left end of FIGURE 1.
Figure 1:
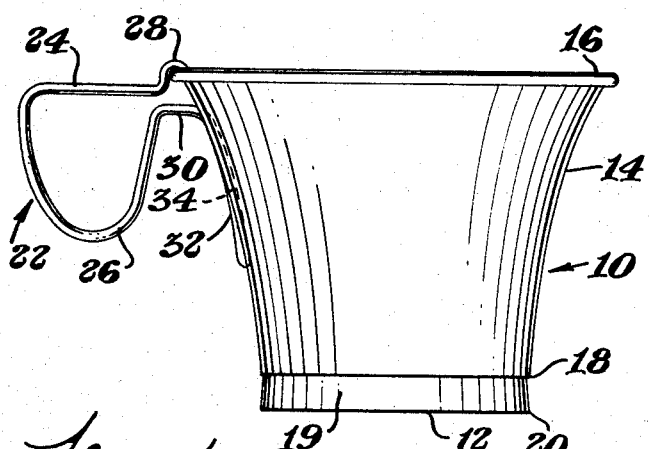
FIGURE 1 is a side elevational view of a disposable cup with handle employing the principles of the present invention.

Since handle 22 is actually bent from wire it has two sides which are of the same construction and are linked together by a cross-over 38 as seen in FIGURE 3. The handle 22 is of a single piece construction and has a width which is defined by the cross-over 38. This width of the handle determines the lateral width of the channel 36 and the downward extent of the leg 32 determines the downward extent of the channel 36 so that the leg 32 just sets snugly within the channel 36 and, preferably, is generally flush with and thus blends in with the side wall contour.

Figure 5:
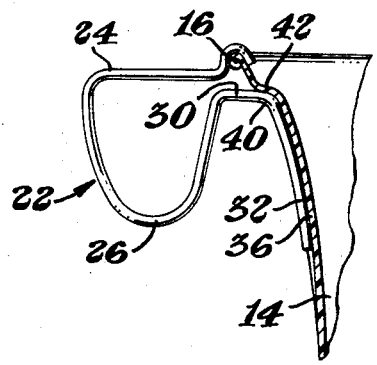
FIGURE 5 is a fragmentary cross sectional view thereof taken along the line 5—5 of FIGURE 2.
Figure 4:
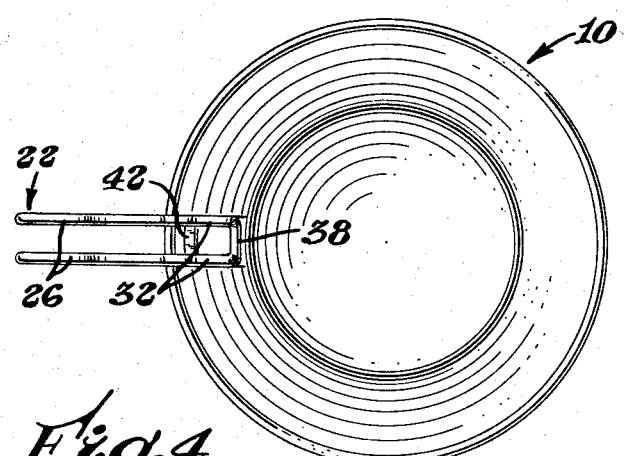
FIGURE 4 is a bottom view thereof.
Figure 7:
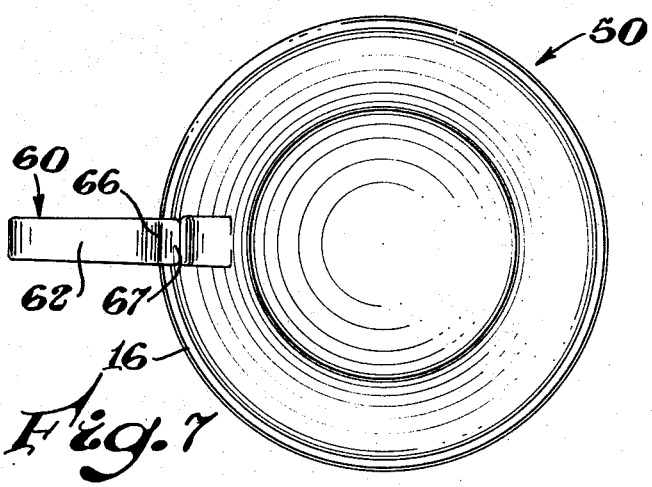
FIGURE 7 is a top plan view thereof.
Figure 8:
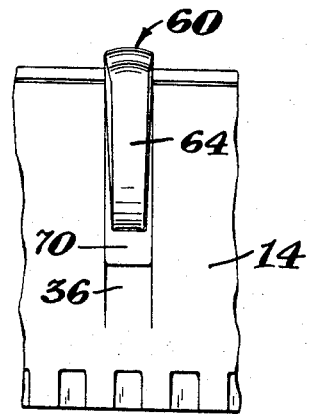
FIGURE 8 is a fragmentary rear elevational view thereof looking at the left end of FIGURE 6.
Figure 6:
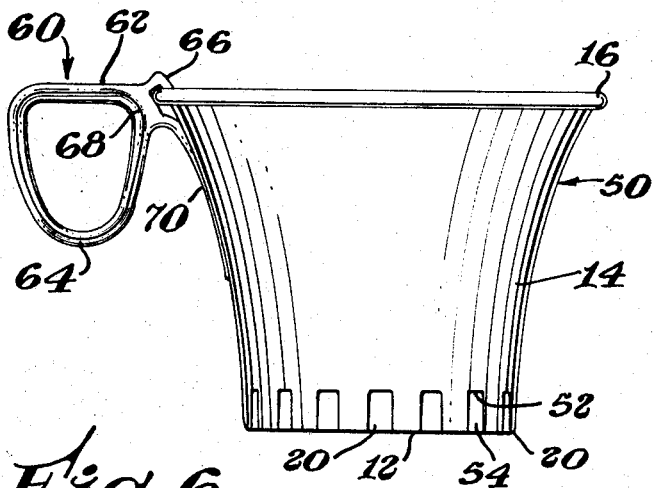
FIGURE 6 is a side elevational view of a modified form of a disposable cup with handle constructed according to the principles of the present invention.
Figure 10:
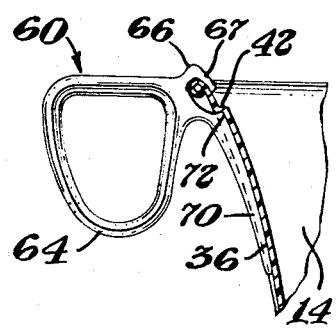
FIGURE 10 is a fragmentary cross sectional view thereof taken along the line 10—10 of FIGURE 7.
Figure 9:
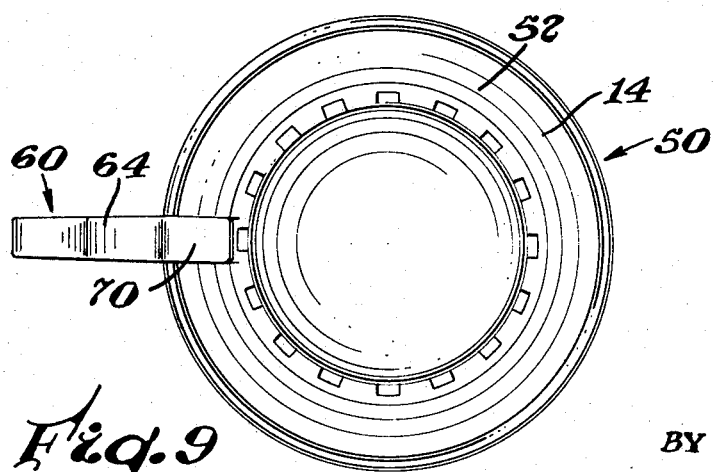
FIGURE 9 is a bottom view thereof.

Referring more particularly to FIGURE 5, it is seen that where horizontal extension 30 joins leg 32 there is a sharp obtuse angle portion 40 formed, which angle portion fits under a ledge 42 formed in the side wall 14 of the cup at the upper extent of the channel 36. When the handle is gripped by the user and the cup is filled with a liquid, upward pressure is exerted by the angle portion 40 and leg 32 to counterbalance the downwardly directed forces applied by the shoulder 42 and side wall 14 of the cup, the horizontal portion 24 of handle 22 being in tension.

By this arrangement it can be appreciated that the handle 22 is held firmly in position, will not slip out of the channel even when the cup is filled with liquid and being used for drinking, and will sufficiently provide counterbalancing forces for the weight of the cup, so that it is only necessary to hold the cup by the handle. All of this is obtained in an inexpensive construction adapted for one-time usage.

The differences in the modification of FIGURES 6–10 primarily lie in the handle portion. However, cup 50, while substantially like cup 10 previously described (like reference characters being applied wherever possible), does have a discontinuous stack shoulder 52 instead of a continuous one as is clearly evident from viewing FIGURE 6. In this case the peripheral edge 20 sits upon the internal shoulder 52 (comparable to the earlier described shoulder 18) of each inwardly directed wedge section 54 of the bottom stacking feature.

Handle 60 is preferably of solid plastic and has a horizontal portion 62 which is continuously joined with a U-shaped finger gripping portion 64. Extending outwardly and downwardly from the horizontal portion 62 is hook 66 the outer limb 67 of which is spaced from a section 68 located between horizontal portion 62 and finger gripping portion 64. This spacing between the outer limb 67 and section 68 is of a distance substantially that of the width of the rim 16. The angle of the outer limb 67 of hook 66 substantially conforms to that of the inside of the side wall 14 of the cup. Extending outwardly and downwardly from connecting section 68 is biasing leg 70 which is adapted to mate with channel 36 of side wall 14, as is seen most clearly in FIGURE 10. The outwardly extending portion of leg 70 has an obtuse angle portion 72 which is received by the shoulder 42 of the cup 10.

The leg 70 and obtuse angle portion 72 function in a manner like that of the leg 32 and obtuse angle portion 40 shown in the embodiment of FIGURES 1–5. Again, an especially secure relationship between the disposable cup and handle, wherein the handle may be assembled by the ultimate user, is accomplished by the present invention.

It is understood that while the present container is primarily concerned with the use of hot beverages or other hot liquids it might also be used with cold or room temperature liquids, or with other than liquid products, and may find considerable demand in the ever widening area of disposable service ware or dinnerware as used in meals served in plants, schools, hospitals, institutions, etc. The use of such an item can substantially reduce the high labor cost involved in food service and clean up, which has heretofore been common.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. The combination of a disposable plastic cup and handle wherein the handle can be assembled to the cup, said cup comprising a bottom wall, a side wall, a channel extending downwardly from an upper portion of said side wall, and a rim at the upper end of said side wall, said handle comprising a hook engaged over said rim, a finger gripping portion extending outwardly from said hook, and an outwardly and downwardly veering leg extending from said finger gripping portion and engaged in said channel, said channel veering downwardly at substantially the same angle as said leg and presenting an inwardly directed ledge at its uppermost extent.

2. The combination of claim 1 wherein said leg presents an obtuse angular portion at its upper outermost extent adjacent said leg.

References Cited

UNITED STATES PATENTS

| | | | |
|---|---|---|---|
| D. 204,781 | 5/1966 | Wanderer | 229—1.5 |
| 2,070,367 | 2/1937 | Mackilbank | 294—33 |
| 2,082,005 | 6/1937 | Jenett | 229—52 |
| 2,128,466 | 8/1938 | Machotka | 229—52 |
| 2,630,244 | 3/1953 | Brock | 220—94 |
| 2,834,533 | 5/1958 | Carew | 229—52 |
| 3,288,340 | 11/1966 | Shapiro et al. | 229—1.5 |
| 3,335,901 | 8/1967 | Edwards | 220—60 |

DAVID M. BOCKENEK, *Primary Examiner.*

UNITED STATES PATENT OFFICE
CERTIFICATE OF CORRECTION

Patent No. 3,409,208　　　　　　　　　　　　　November 5, 1968

Clara Virginia Eicholtz et al.

It is certified that error appears in the above identified patent and that said Letters Patent are hereby corrected as shown below:

Column 4, line 26, "leg" should read -- ledge --.

Signed and sealed this 10th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents